(12) United States Patent
Mansour et al.

(10) Patent No.: US 9,428,285 B2
(45) Date of Patent: Aug. 30, 2016

(54) SYSTEM AND METHOD FOR MANAGING MOMENTUM ACCUMULATION

(71) Applicant: The Boeing Company, Chicago, IL (US)

(72) Inventors: Sadek W. Mansour, Torrance, CA (US); John D. Haskell, Chino Hills, CA (US); Andrew I. Mactavish, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 67 days.

(21) Appl. No.: 14/461,415

(22) Filed: Aug. 17, 2014

(65) Prior Publication Data

US 2016/0046395 A1 Feb. 18, 2016

(51) Int. Cl.
*B64G 1/26* (2006.01)
*B64G 1/28* (2006.01)
*B64G 1/24* (2006.01)

(52) U.S. Cl.
CPC .............. *B64G 1/26* (2013.01); *B64G 1/283* (2013.01); *B64G 2001/245* (2013.01)

(58) Field of Classification Search
CPC ......... F02K 9/80; B64G 1/283; B64G 1/288; B64G 1/26; B64G 1/24
USPC .................. 701/13; 244/164, 165, 166, 169
See application file for complete search history.

(56) References Cited

U.S. PATENT DOCUMENTS

| | | | |
|---|---|---|---|
| 4,010,921 A * | 3/1977 | Pistiner | B64G 1/283 244/165 |
| 4,767,084 A * | 8/1988 | Chan | B64G 1/24 244/164 |
| 5,395,076 A * | 3/1995 | Lichtin | F02K 9/80 244/169 |
| 5,459,669 A * | 10/1995 | Adsit | B64G 1/24 244/169 |
| 5,850,993 A | 12/1998 | Hubert | |
| 5,957,411 A * | 9/1999 | Liu | B64G 1/26 244/164 |
| 6,032,903 A * | 3/2000 | Fowell | B64G 1/24 244/164 |
| 6,053,455 A * | 4/2000 | Price | B64G 1/26 244/169 |
| 6,908,064 B2 | 6/2005 | Goodzeit et al. | |
| 7,918,420 B2 | 4/2011 | Ho | |
| 8,282,043 B2 | 10/2012 | Ho | |
| 8,439,312 B2 | 5/2013 | Ho et al. | |
| 2004/0069905 A1* | 4/2004 | Goodzeit | B64G 1/283 244/169 |
| 2014/0032022 A1* | 1/2014 | Caullier | B64G 1/288 701/13 |

OTHER PUBLICATIONS

Skelly et al., "Power Conditioning Unit for Low-Power Arcjet Flight Application," AIAA 92-3529 (1992).
Fisher et al., "The Design and Development of the MR-510 Arcjet Power Conditioning Unit," AIAA 98-3630 (1998).
Zube et al., "Initial On-orbit Performance of Hydrazine Arcjets on A2100™ Satellites," AIAA 99-2272 (1999).

* cited by examiner

*Primary Examiner* — Yuri Kan
(74) *Attorney, Agent, or Firm* — Walters & Wasylyna LLC

(57) ABSTRACT

A system for managing momentum accumulation of a spacecraft in orbit may include a reaction wheel assembly for controlling an attitude of a body of a spacecraft, the body defining at least one face, and absorbing momentum, a plurality of arcjet thrusters coupled to the face to generate thrust, and a control processor coupled to the plurality of arcjet thrusters for controlling the thrust, wherein actuation of each arcjet thruster of the plurality of arcjet thrusters is configured to produce a net momentum accumulation in the reaction wheel assembly that is below a momentum saturation point of the reaction wheel assembly.

22 Claims, 6 Drawing Sheets

SYSTEM AND METHOD FOR MANAGING MOMENTUM ACCUMULATION

FIELD

The present disclosure is generally related to spacecraft and, more particularly, to momentum management of a spacecraft during orbit change maneuvers.

BACKGROUND

Orbital motions of a spacecraft tend to cause drift, for example, in a north-south direction, away from a desired station orientation. To account for this drift, chemical thrusters are utilized to perform station-keeping maneuvers. However, station-keeping maneuvers and other environmental torques tend to produce a momentum accumulation in the spacecraft. To account for this momentum accumulation, chemical thrusters are utilized to unload the accumulated momentum.

The chemical thrusters operate by expelling propellant mass heated by means of a chemical reaction. The more often the chemical thrusters are utilized to unload the accumulated momentum, the more fuel (e.g., propellant) is used, which may have a detrimental impact on the life of the spacecraft.

Accordingly, those skilled in the art continue with research and development efforts in the field of momentum management and fuel efficiency of spacecraft in orbit.

SUMMARY

In one embodiment, the disclosed system may include a reaction wheel assembly for controlling an attitude of a body of a spacecraft in orbit defining at least one face and absorbing momentum, a plurality of arcjet thrusters coupled to the face to generate thrust, and a control processor coupled to the plurality of arcjet thrusters for controlling the thrust, wherein actuation of each arcjet thruster of the plurality of arcjet thrusters is configured to produce a net momentum accumulation in the reaction wheel assembly that is below a momentum saturation point of the reaction wheel assembly.

In another embodiment, the disclosed method may include (1) actuating a plurality of arcjet thrusters to generate a thrust, (2) absorbing momentum in a reaction wheel assembly in response to the thrust, (3) modulating at least one of a power level and a timing of firing of the plurality of arcjet thrusters, and (4) controlling the momentum accumulated in the reaction wheel assembly to minimize a net momentum accumulation in the reaction wheel assembly.

In yet another embodiment, the disclosed method may include (1) actuating a first arcjet thruster to generate a first thrust, (2) increasing momentum accumulated in a reaction wheel assembly in response to a first directional component of momentum about an axis of momentum generated by the first thrust, (3) actuating a second arcjet thruster to generate a second thrust, and (4) decreasing the momentum accumulated in the reaction wheel assembly in response to a second directional component of momentum about the axis of momentum generated by the second thrust, wherein a net momentum accumulation in the reaction wheel assembly is below a momentum saturation point of the reaction wheel assembly.

Other embodiments of the disclosed system and method will become apparent from the following detailed description, the accompanying drawings and the appended claims.

DETAILED DESCRIPTION

Figure 1:
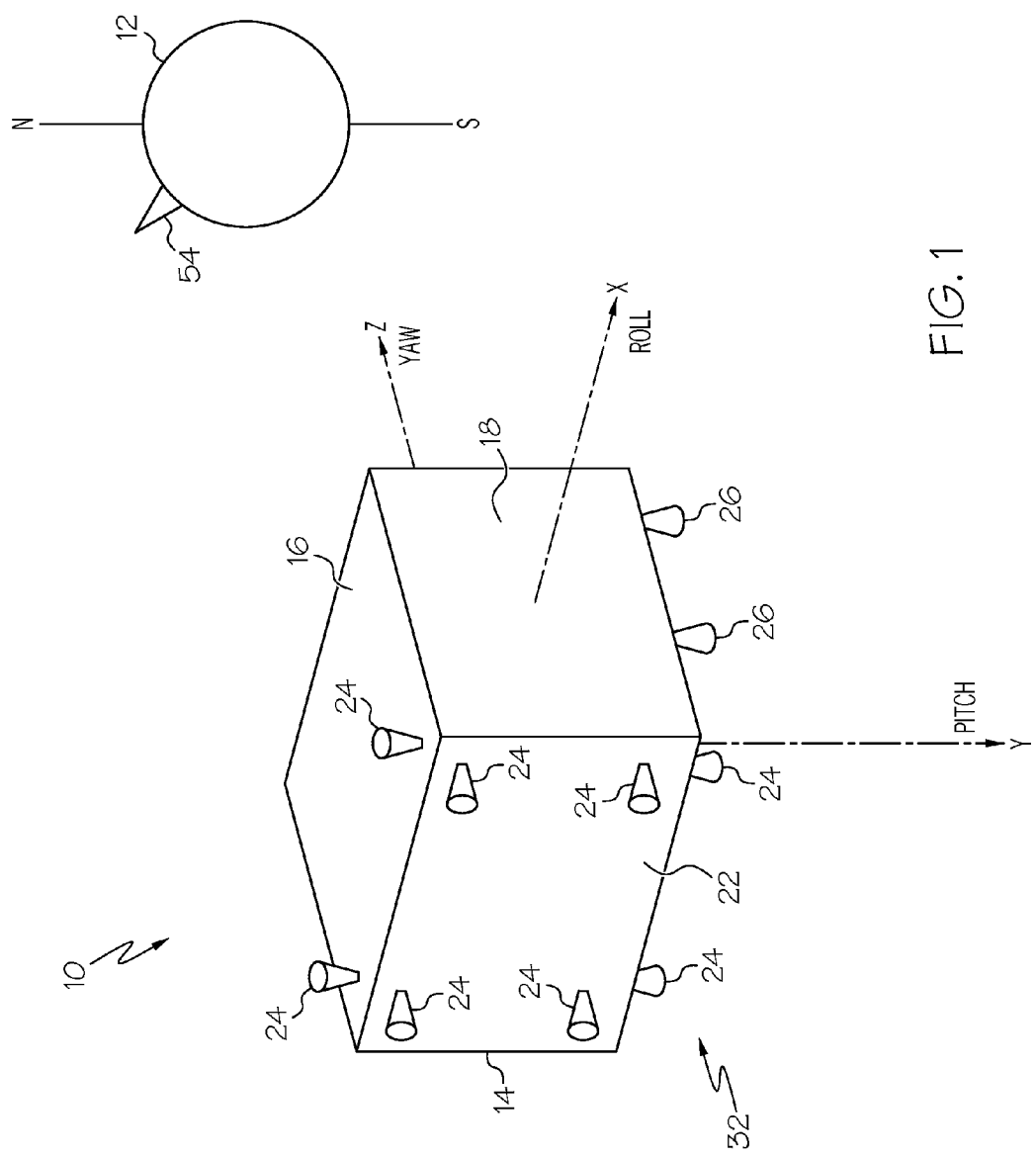
FIG. 1 is a schematic perspective view of one embodiment of the disclosed spacecraft in orbit.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 represents one embodiment of the disclosed spacecraft, generally designated 10, in orbit about Earth 12. As one example, the spacecraft 10 may be a satellite in geosynchronous orbit about the Earth 12 at a rate that matches the Earth's rate of revolution, so that the satellite remains above a fixed point on the Earth 12. As a general, non-limiting example, the spacecraft 10 may be a weather satellite or a communications satellite carrying a service payload of sensors, transponders and/or antennas (not shown in FIG. 1). The spacecraft 10 may include a body 14 having an associated pitch, roll, and yaw and a propulsion system 68 (FIG. 3) to provide maneuver thrust for controlling attitude and/or managing momentum. The spacecraft may include one or more attitude sensors 48 (FIG. 3) including, but not limited to, a position sensor, a gyroscope, a star tracker, an Earth sensor, a Sun sensor and the like, for estimating and/or aiding in determining attitude of the body 14. As used herein, attitude may refer to the orientation of the body 14 of the spacecraft 10 in space relative to the Earth 12.

Figure 2:
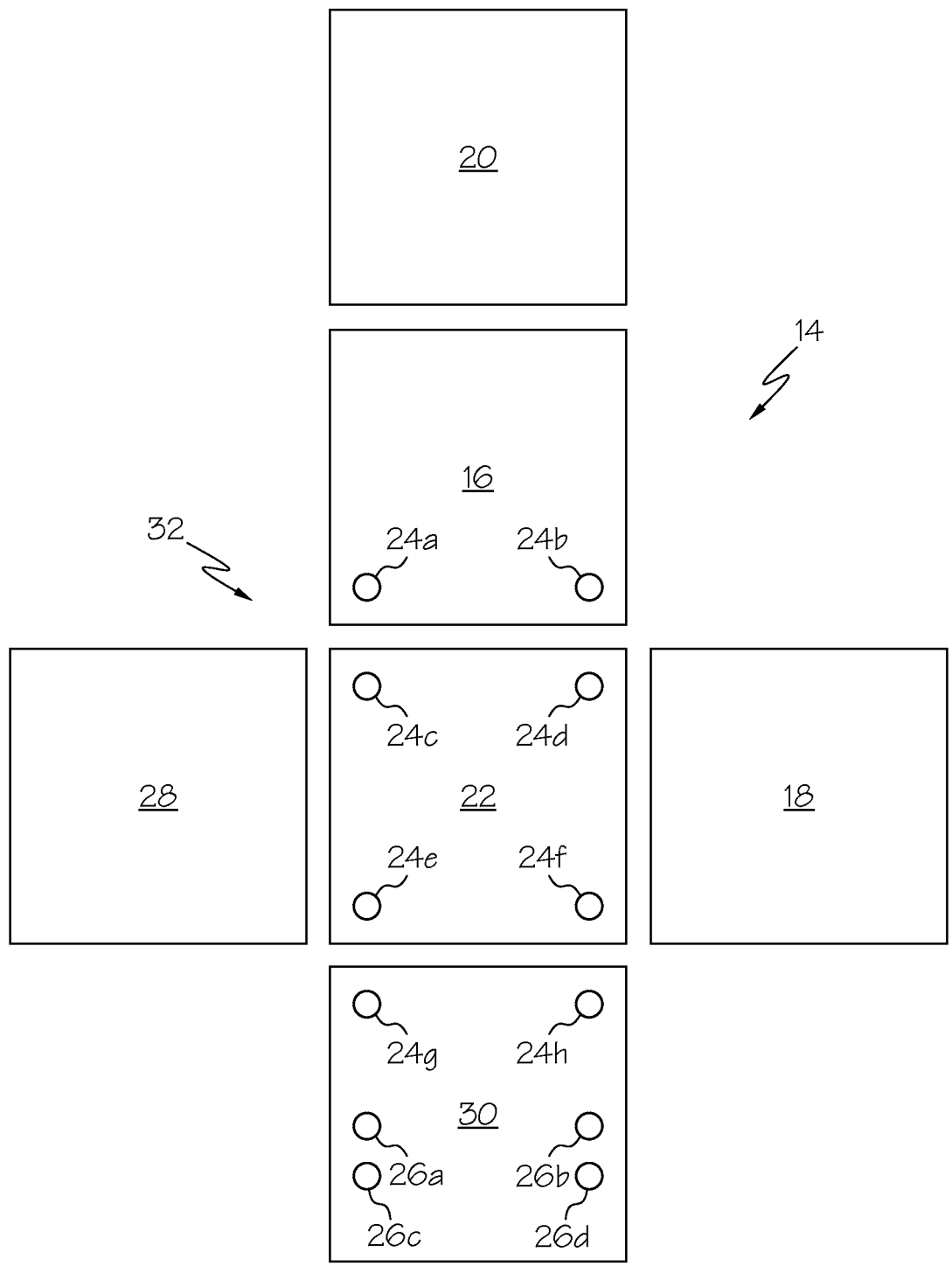
FIG. 2 is a schematic diagram of one embodiment of the body of the spacecraft representing the earth face, anti-earth face, north face, south face, east face and west face, and showing velocity change thruster locations.

FIG. 2 represents one embodiment of the body 14 of the spacecraft 10. The body 14 may include a north-facing side 16 (also referred to herein as a north face), an east-facing side 18 (also referred to herein as an east face), a west-facing side 28 (also referred to herein as a west face), a south-facing side 30 (also referred to herein as a south face), an earth-facing side 20 (also referred to herein as an earth face), and an anti-earth-facing side 22 (also referred to herein as an anti-earth face).

Referring to FIG. 1, the spacecraft 10 may include a center of gravity 66 (e.g., center of mass) (FIGS. 5 and 6) and a roll axis X (e.g., velocity vector of the spacecraft 10), a pitch axis Y (e.g., a southerly pointed vector), and a yaw axis Z (e.g., an Earth pointing vector) extending through the center of gravity 66. In order to perform certain functions, such as communication functions with an Earth located ground station 54, the spacecraft 10 must maintain the body 14 in a controlled orientation (e.g., attitude). As one example, and as illustrated in FIG. 1, a desired attitude may maintain the north face 16 of body 14 orthogonal to the pitch axis Y, the east face 18 of the body 14 orthogonal to the roll axis X, and the earth face 20 (FIG. 2) and anti-earth face 22 of the body 14 orthogonal to the yaw axis Z. Such three-axis stabilized spacecraft 10 may use opposing sets of velocity change ("ΔV") thrusters 32 to control north-south and/or east-west motions. Operation (e.g., actuation) of the ΔV thrusters 32 may provide thrust in a specific direction (e.g., a northerly, southerly, easterly and/or westerly direction).

As an example, north-south ΔV thrusters 32 may produce the required north-south change in spacecraft velocity to control orbit inclination (e.g., the north-south position of the spacecraft 10 relative to the Earth's equator). As another example, north-south ΔV thrusters 32 may also produce an east-west change in spacecraft velocity if some or all of the north-south ΔV thrusters 32 are canted and include a thrust component along an east-west direction. Additionally, east-west ΔV thrusters (not shown) may produce the required combined east-west change in spacecraft velocity to control drift (the east-west position of the spacecraft 10 relative to a sub-satellite point on the Earth 12) and/or eccentricity (the measure of the non-circularity of the spacecraft orbit or the measure of the variation in the distance between the spacecraft 10 and the Earth 12 as the spacecraft 10 orbits the Earth 12.

Ordinary orbital maneuvers (e.g., east-west motions) of the spacecraft 10 may tend to cause drift in a north-south direction away from the desired orientation (e.g., a station attitude). Station-keeping maneuvers may be required in any direction; however, one type of maneuver that may be regularly required (e.g., on an approximately weekly basis) is a north-south station-keeping maneuver. As such, the spacecraft 10 may include a plurality of ΔV thrusters 32 provide thrust in a specific direction.

In an example embodiment, the ΔV thrusters 32 of the spacecraft 10 may include a plurality of reaction control system ("RCS") thrusters 24 and/or a plurality of arcjet thrusters 26 to produce thrust for attitude control maneuvers and/or for station-keeping maneuvers. In one example implementation, in order to maximize use of the available propellant 40, particularly used for station-keeping maneuvers, the mass specific impulse of certain directional-facing (e.g., north-facing or south-facing) ΔV thrusters 32 (e.g., arcjet thrusters 26) may be maximized or optimized.

As an example, the RCS thrusters 24 may provide thrust for north-south and/or east-west attitude movements and/or distance from Earth movements of the spacecraft 10. The RCS thrusters 24 may be chemical thrusters that operate by expelling propellant that is heated by way of a chemical reaction. As an example, the RCS thrusters 24 may burn a chemical propellant or produce an ion discharge to produce thrust. For example, such a chemical reaction may be based upon a bipropellant fuel-oxidizer system or upon a monopropellant-catalyst system (e.g., one that uses hydrazine propellant).

As another example, the arcjet thrusters 26 may provide thrust for north-south and/or east-west station-keeping movements. The arcjet thrusters 26 may be electro-thermal thrusters ("arcjets") that use electrical discharge (e.g., electrical energy) of an electrical arc to heat (e.g., increase the enthalpy of) the flow of propellant 40 (e.g., a propellant mass), such as the propellant originating from a chemical reaction similar to that of the RCS thrusters 24. The energy of the electrical arc results in an increased specific impulse ("ISP") of the arcjet over an equivalent chemical thruster (e.g., RCS thruster 24). Specific impulse is a measure of the thrust resulting from a rate of propellant mass expulsion, with dimensions of lbf/lbm/sec=sec. As one specific, non-limiting example, the arcjet thruster 26 may have a specific impulse of approximately 600 sec.

Referring to FIG. 2, in a non-limiting example embodiment of the spacecraft 10, RCS thrusters 24 may be mounted on the north face 16, the south face 30, the earth face 20, the anti-earth face 22, the east face 18, and/or the west face 28 to be used for attitude control maneuvers. In an example construction, RCS thrusters 24a and 24b may be mounted on the north face 16 of the body 14. For example, RCS thrusters 24a and 24b may be located proximate (e.g., at or near) opposing corners of the north face 16 proximate the anti-earth face 22. RCS thrusters 24c, 24d, 24e and 24f may be mounted on the anti-earth face 22 of the body 14. For example, RCS thrusters 24c, 24d, 24e and 24f may be located proximate the corners of the anti-earth face. RCS thrusters 24g and 24h may be mounted on the south face 30 of the body 14. For example, RCS thrusters 24g and 24h may be located proximate opposing corners of the south face 30 proximate the anti-earth face 22.

In another non-limiting example embodiment of the spacecraft 10, the arcjet thrusters 26 may be mounted on the north face 16 and/or the south face 30 to be used for north-south station-keeping maneuvers while maintaining the spacecraft's payload services (the arcjet thrusters 26 are shown mounted on the south face 30 in FIG. 2). In an example construction, and as shown in FIG. 2, arcjet thruster (e.g., a first arcjet thruster) 26a, arcjet thruster (e.g., a second arcjet thruster) 26b, arcjet thruster (e.g., a third arcjet thruster) 26c, and arcjet thruster (e.g., a fourth arcjet thruster) 26d may be mounted on the south face 30. For example, the arcjet thrusters 26a and 26c be may be located proximate an edge of the south face 30 proximate the west face 28 and arcjet thrusters 26b and 26d may be located proximate an opposing edge of the south face 30 proximate the east face 18.

Unless otherwise indicated, the terms "first," "second," "third," "fourth," etc. are used herein merely as labels, and are not intended to impose ordinal, positional, or hierarchical requirements on the items to which these terms refer.

In another example construction, arcjet thruster (e.g., the first arcjet thruster) 26a and arcjet thruster (e.g., the second arcjet thruster) 26b may be mounted on the south face 30, for example, located proximate the edges of the south face 30 proximate the west face 28 and the east face 18, respectively.

An example station-keeping maneuver may be performed by energizing an opposed pair of arcjet thrusters 26 to minimize yaw momentum accumulation (e.g., momentum about the yaw axis Y). As one example, opposed arcjet thruster pair 26a and 26b or opposed arcjet thruster pair 26c and 26d may be fired (e.g., energized with the electrical arc and operated by expelling propellant). As another example, diagonally opposed arcjet thruster pair 26a and 26d or diagonally opposed arcjet thruster pair 26b and 26c may be fired. As yet another example, opposed arcjet thruster pairs 26a, 26b and 26c, 26d may be fired.

Figure 5:
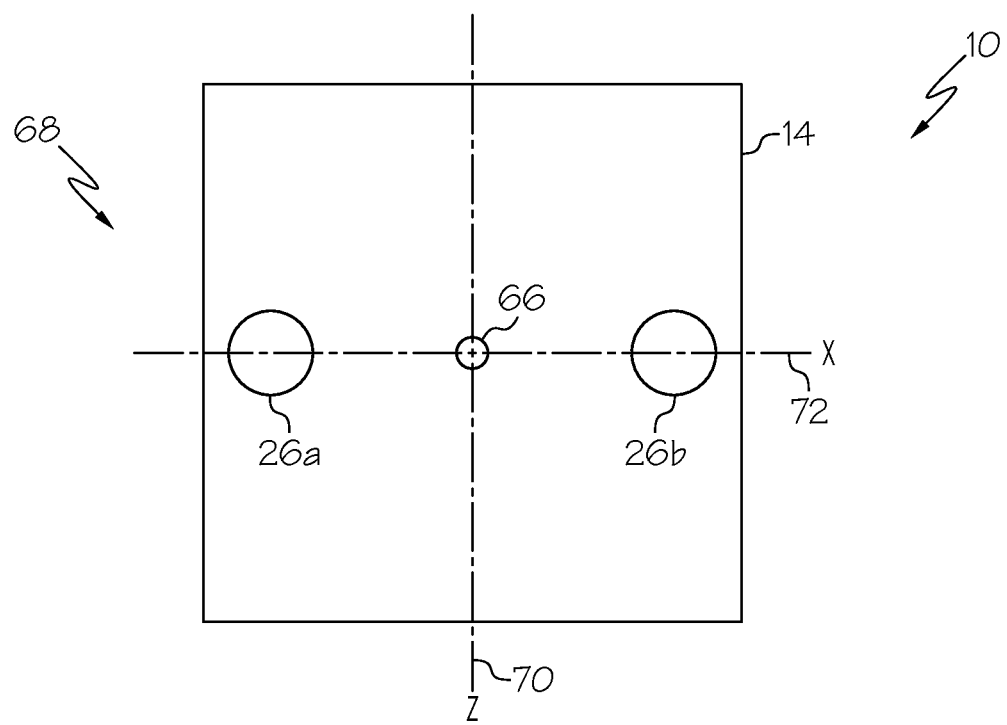
FIG. 5 is a schematic diagram of one implementation of the disclosed system.
Figure 6:
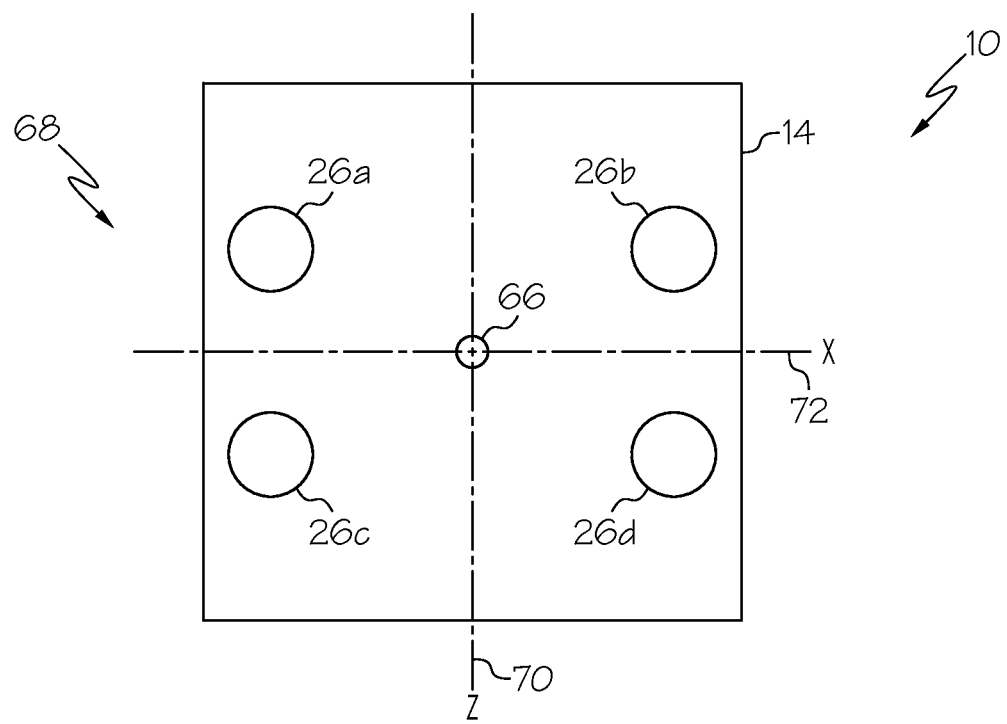
FIG. 6 is a schematic diagram of another implementation of the disclosed system.

Those skilled in the art will recognize that the number, position and/or location of the ΔV thrusters 32 (e.g., RCS thrusters 24 and/or arcjet thrusters 26) may depend on various factors and/or constraints including, but not limited to, a center of gravity 66 (e.g., center of mass) (FIGS. 5 and 6) of the spacecraft 10, the position of the spacecraft's solar array (not shown) when in the stowed and deployed configurations, and the like. As an example, and as shown in FIGS. 5 and 6, the arcjet thrusters 26 may be located at suitably positions to bracket the center of gravity 66 of the spacecraft 10, such as when in a deployed configuration. As another example, the opposed arcjet thruster pair or pairs may be configured to produce substantially the same amount of thrust with lines of action of the thrust being mutually parallel and at equal distances from the center of gravity 66 of the spacecraft 10. As yet another example, the arcjet thrusters 24 may be located and/or angularly oriented to minimize drag and/or torque effects on the solar array due to thruster plume impingement.

Figure 3:
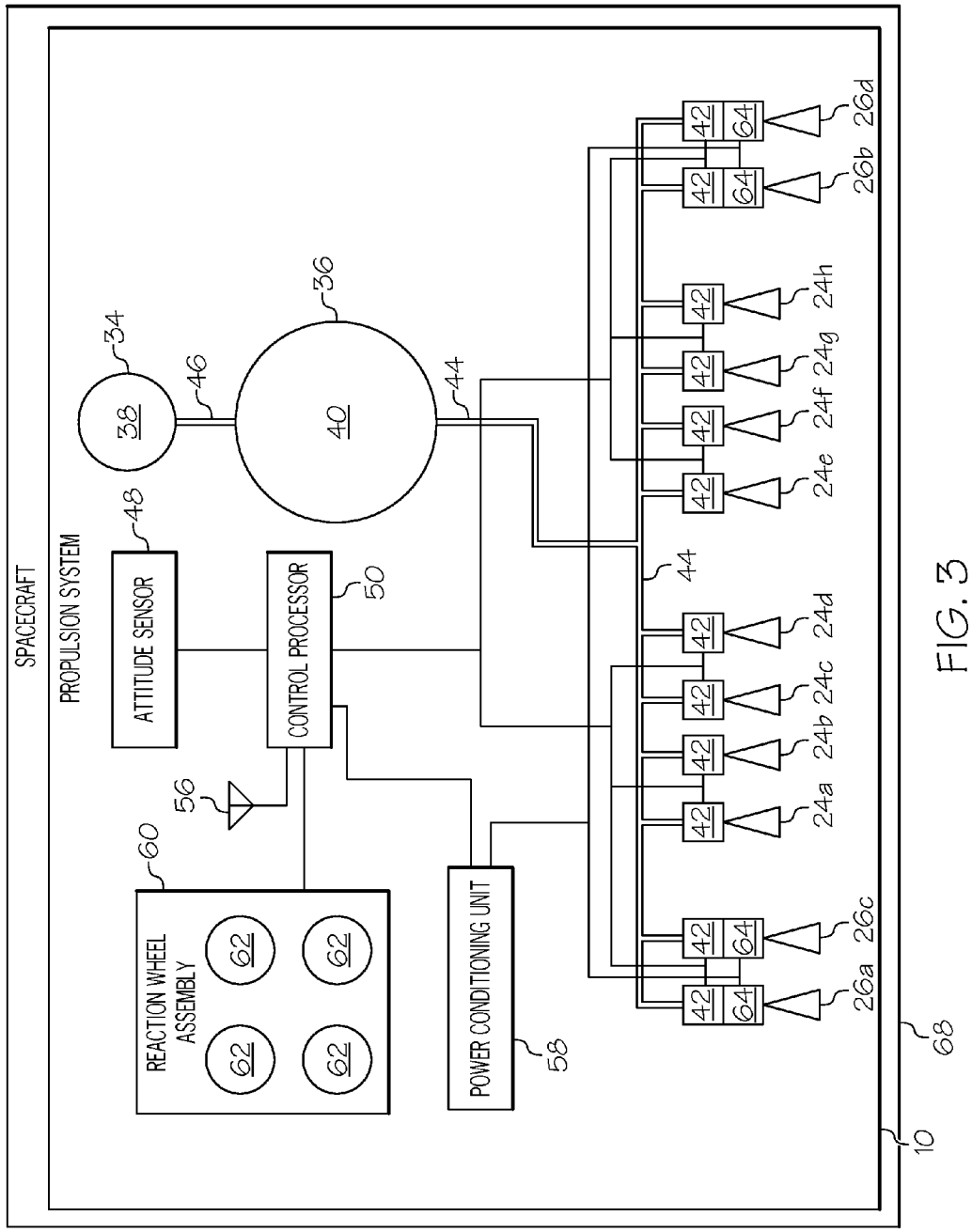
FIG. 3 is a schematic block diagram of the disclosed system for managing momentum accumulation of a spacecraft of FIG. 1.

Referring to FIG. 3, in one embodiment of the disclosed system, generally designated 68, for managing momentum (e.g., angular momentum) accumulation of the spacecraft 10 in orbit, may include the reaction wheel assembly 60 for controlling the attitude of the body 14 and absorbing momentum (e.g., angular momentum) in response to a torque applied to the body 14 by actuation of a plurality of arcjet thrusters 26. The plurality of arcjet thrusters 26 may be coupled to a face (e.g., the south face 30) of the body 14 to generate thrust. A spacecraft control processor 50 may be coupled to the plurality of arcjet thrusters 26 for controlling the thrust. Actuation of each arcjet thruster 26 of the plurality of arcjet thrusters (e.g., arcjet thrusters 26a, 26b, 26c, 26d) may be configured to produce a net momentum accumulation in the reaction wheel assembly 60 that is below a momentum saturation point of the reaction wheel assembly. For example, the net momentum accumulation may be zero.

In an example embodiment, the system 68 of may include one or more pressurant tanks 34 (only one pressurant tank 34 is shown in FIG. 3), one or more propellant tanks 36 (only one propellant tank 36 is shown in FIG. 3), and the plurality of arcjet thrusters 26 and the plurality of RCS thrusters 24, for example having the configuration shown in FIG. 2.

The pressurant tank 34 may house or store a volume of pressurized gaseous pressurant 38. As one example, the pressurant 38 may be pressured gaseous helium. The pressurant tank 34 may provide the pressurant 38 to the propellant tank 36. In an example construction, the pressurant 38 may be provided through a pressurant direction system 46 (e.g., piping system) having one or more valves and/or manifolds (not shown) to the propellant tank 36.

The propellant tank 36 may house or store a volume of liquid propellant 40. As an example, the propellant 40 may include a liquid bipropellant or a liquid monopropellant. As a specific, non-limiting example, the propellant 40 may include liquid hydrazine ($N_2H_4$). The propellant 40 may flow through a propellant direction system 44 (e.g., piping system) and be distributed to the RCS thrusters 24 (e.g., RCS thrusters 24a, 24b, 24c, 26d, 24e, 24f, 24g, 24h) and/or the arcjet thrusters 26 (e.g., arcjet thrusters 26a, 26b, 26c, 26d). The propellant direction system 44 may include one or more filters (not shown). In an example construction, the propellant direction system 44 may include a controllable first main valve and/or a manifold (not shown) to distribute the propellant 40 to RCS thrusters 24a, 24b, 24c, 24d and/or arcjet thrusters 26a, 26c associated with a first half of the system 68. Similarly, the propellant direction system 44 may include a controllable second main valve and/or a manifold (not shown) to distribute the propellant 40 to RCS thrusters 24e, 24f, 24g, 24h and arcjet thrusters 26b, 26d associated with a second half of the system 68.

In such a construction, either the first half or the second half of the system 68 may be capable of providing attitude control maneuvers and/or station-keeping maneuvers. Each RCS thruster 24 and arcjet thruster 26 may include at least one valve 42 for controlling a flow of propellant 40 (e.g., fuel). In the event that a valve 42 of an associated thruster (e.g., RCS thruster 24 or arcjet thruster 26) should fail (e.g., in an open position that would allow propellant 40 to escape or in a closed position that would prevent operation of the thruster), the main valve corresponding to that half of the system 68 may be closed to prevent that corresponding half of the system 68 from emptying the propellant 40 from the propellant tank 36.

In another example construction (not shown), at least one redundant propellant direction system (e.g., a propellant redirection system including associated valves, manifolds, and/or filters) may distribute the propellant 40 to RCS thrusters 24 and/or the arcjet thrusters 26 of a corresponding half of the system 68 in the event that a main valve fails or a filter clogs.

In another embodiment, the system 68 may include an attitude control sensor 48 for estimating and/or aiding in determining attitude, rate, and/or momentum state of the spacecraft 10 (e.g., the body 14). The attitude sensor 48 may be in communication with the control processor 50. The attitude sensor 48 may be coupled (e.g., connected) to the control processor 50 by electrical conductors of a control/power bus, referred to collectively as "bus" 52.

The control processor may control a time of firing of the arcjet thrusters 26 (e.g., at least one opposed arcjet thruster pair), as described herein below, to modulate the thrust provided by the arcjet thrusters 26 to maintain attitude while minimizing momentum accumulation and minimizing the use of propellant 40 utilized for a momentum unloading operation and/or an attitude control maneuver.

The spacecraft 10 may also include a gyroscope (not shown) to provide attitude rate estimation.

In an example implementation, the spacecraft 10 may be controlled and/or commanded from the ground station 54 (FIG. 1). For example, the control processor 50 may be in communication with the ground station 54 by an antenna 56 to receive ground command signals. In another example implementation, the spacecraft 10 control may be executed by the control processor 50 without ground command signals (e.g., self-controlling).

In another example embodiment, a power conditioning unit 58 may be electrically coupled to an electrical arc generator 64 of the arcjet thrusters 26 by the bus 52. The electrical arc generator 64 may receive voltage from an electrical system (not shown) of the spacecraft 10 to generate the electrical arc in a known manner. The arcjet thrusters 26 may be operated in an augmented mode (e.g., with the electrical arc) or in an un-augmented mode (e.g., without the electrical arc). Those skilled in the art will recognize that operating the arcjet thrusters 26 in the augmented mode may be more advantageous due to the ISP being higher than operation in the un-augmented mode.

The power conditioning unit 58 may control the energy of the electrical arc of the arcjet thrusters 26 (e.g., at least one opposed arcjet thruster pair), as described herein below, to modulate the thrust provided by the arcjet thrusters 26 to maintain attitude while minimizing momentum accumulation and minimizing the use of propellant 40 utilized for a momentum unloading operation and/or an attitude control maneuver. The power conditioning unit 58 may vary the power level of any particular arcjet thruster 26 (e.g., the power supplied to the electrical arc generator 64 of an associated arcjet thruster 26). The power conditioning unit 58 may operate (e.g., control) the arcjet thrusters 26 at any one of a plurality of discrete power levels (e.g., throttle settings). As an example, the power level of the arcjet thrusters 26 may be set by the power conditioning unit 58 at a discrete setting between 1500 W and 2000 W. The thrust level (e.g., magnitude) and the ISP of the arcjet thruster 26 may vary based upon the power level and the feed pressure of the propellant 40.

In another embodiment, the reaction wheel assembly 60 may include one or more reaction wheels 62, also known as momentum wheels, (a plurality of reaction wheels 62 is shown in FIG. 3). The reaction wheel assembly 60 may be electrically coupled to the control processor 50 for control thereof. In a specific, non-limiting example construction, the reaction wheel assembly 60 may include four reaction wheels 62 in a pyramid configuration. The reaction wheel assembly 60 may provide a measure of orientation, attitude control (e.g., through the conservation of angular momentum), and/or momentum absorption during maneuvers (e.g., station-keeping maneuvers, attitude control maneuvers, and/or other normal operating maneuvers).

Attitude control may be achieved by changing the speed (e.g., rotational speed) of the reaction wheels 62. The change in speed of the reaction wheel 62 may change its momentum and such a momentum change is coupled to the body 14 of the spacecraft 10. In an example construction, the reaction wheel 62 may be driven by an electric motor (not shown) and the spacecraft 10 may generate electricity supplied to the electric motor.

A set of reaction wheels 62 oriented along different axes (e.g., different axis of momentum) may define the reaction wheel assembly 60 and may change the attitude of the spacecraft 10 by changing the rotational speeds of the various reaction wheels 62. An ordinary orbit environment of the spacecraft 10 is such that maintaining an attitude in which a particular face (e.g., the earth face 20) of the spacecraft 10 is directed toward Earth may require ever increasing maximum rotational speeds of the reaction wheels 62. However, those skilled in the art will recognize that the material strength and/or dimensional limitations of the reaction wheels 62 may limit maximum rotational speeds, thus, defining a saturation point of the reaction wheel 62. As used herein, the momentum saturation point of the reaction wheel assembly 60 may be defined by the maximum rotational speed of one or more reaction wheels 62.

Accordingly, when a reaction wheel 62 approaches its maximum speed limit (e.g., saturation point), it must be "unloaded" by changing its speed, and therefore its momentum. Such a momentum unloading (e.g., momentum dumping) operation may transfer momentum (e.g., angular momentum about one or more axis) to the body 14 of the spacecraft 10. Such a momentum transfer to the body 14 of the spacecraft 10 would, if not countered, change the attitude of the spacecraft 10. The momentum transferred to the body 14 of the spacecraft 10 during a momentum unloading operation may be countered by operation of one or more RCS thrusters 24. One or more RCS thrusters 24 may be fired periodically (e.g., before the reaction wheel assembly 60 reaches its momentum saturation point) to unload the momentum about different axes (e.g., axis of momentum) of the body 14 while the reaction wheel assembly 60 maintains the attitude of the spacecraft 10. Thus, during a momentum unloading operation, the momentum change of the reaction wheel 62 is taken up (e.g., offset by) the RCS thrusters 24 with the body 14 of the spacecraft 10 as an intermediate element.

In an example attitude control maneuver or operation (e.g., when station-keeping thrust is not desired or required), the control processor 50 may use the signals from attitude sensor 48 to produce signals that are applied for control of the RCS thrusters 24 (e.g., control of solenoids energized by the control of signals to actuate the valves 42 to provide a propellant flow to the RCS thrusters 24) for attitude control. In another example attitude control maneuver or operation, the control processor 50 may use the signals from attitude sensor 48 to produce signals that are applied for control of the reaction wheel assembly 60 (e.g., control the speed and/or direction of the reaction wheels 62) for attitude control. In yet another example attitude control maneuver or operation, the control processor 50 may use the signals from attitude sensor 48 to produce signals that are applied for control of the RCS thrusters 24 and of the reaction wheel assembly 60 for attitude control.

Thus, the control processor 50 may operate to control only RCS thrusters 24 to control attitude, only the reaction wheel assembly 60 to control attitude, or both the RCS thrusters 24 and the reaction wheel assembly 60 simultaneously to control attitude.

In an example station-keeping maneuver or operation (e.g., when station-keeping thrust is required), the control processor 50 may use the signals from attitude sensor 48 to produce signals that are applied for control of the arcjet thrusters 26 (e.g., control of solenoids energized by the control of signals to actuate the valves 42 to provide a propellant flow to the arcjet thrusters 26) for station-keeping. The signal representative of attitude may be applied from control processor 50 to the power conditioning unit 58, which are electrically coupled by the bus 52. The power conditioning unit 58 may be in communication with the ground station 54, for example by the antenna 56, to receive ground command signals for controlling the power level to the arcjet thrusters 26.

During the station-keeping maneuver, the reaction wheel assembly 60 may maintain the attitude of the spacecraft 10 (e.g., the body 14) by absorbing (e.g., offsetting) the angular momentum created by actuation (e.g., firing) of the arcjet thrusters 26.

In an ideal condition, station-keeping maneuvers provided by the arcjet thrusters 26 may be performed without affecting the attitude of the spacecraft 10 (e.g., requiring attitude control maneuvers provided by the RCS thrusters 24) or without momentum accumulation (e.g., requiring a momentum unloading operation by the RCS thrusters 24). However, operation of the arcjet thrusters 26 during north-south (or east-west) maneuvers may result in torques on the spacecraft 10 (e.g., the body 14) and/or momentum accumulation. Such torques and/or momentum accumulations may also result when the center of gravity 66 of the spacecraft 10 is not aligned with the center of pressure of the arcjet thrusters 26, when the center of gravity 66 of the spacecraft 10 changes (e.g., moves) during the life of the spacecraft 10 (e.g., due to fuel consumption from the beginning of life to the end of life), errors in thruster alignment and/or location, mismatched thrusts produced by opposed pairs of arcjet thrusters 26, misaligned lines of action of the thrusts produced by opposed pairs of arcjet thrusters 26, and/or impingement of the thruster plumes on solar arrays of the spacecraft 10.

Such imbalances of the spacecraft 10 and/or thrusts, as the station-keeping arcjet thrusters 26 are fired, may tend to result in a change in attitude, which may require an attitude control maneuver and/or a momentum accumulation, which may require a momentum unloading operation. The change in attitude may be sensed by the attitude sensor 48, which may communicate with the control processor 50 to fire one or more of the RCS thrusters 24 and/or control rotation of the reaction wheels 62. The RCS thrusters 24 and/or the reaction wheel assembly 60 may be used to directly control the attitude and/or to maintain correct attitude.

Attitude control maneuvers may be required for a variety of other reasons including, but not limited to, properly orienting a communication payload, maintaining the arcjet thrusters 26 pointed in a desired direction (e.g., the south-facing arcjet thrusters 26 pointed in a southerly direction), and the like. Additionally, such attitude control maneuvers may also account for momentum accumulation.

In the example attitude control maneuver and/or momentum unloading operation, the magnitude of the thrust of the RCS thrusters 24 may be controlled by on-pulsing or off-pulsing the RCS thrusters 24, in known manner. However, the low magnitudes of thrust required for attitude control maneuvers and/or momentum unloading operations are such that even small RCS thrusters 24 must be used at low duty cycles. When used at low duty cycles, RCS thrusters 24 may be inefficient in their use of propellant 40. Accordingly, it is desirable to avoid such inefficient use of propellant 40, as the useful life of the spacecraft 10 depends upon how long station-keeping and attitude control propellant lasts.

Accordingly, the present disclosure recognizes and takes into account the benefit of a firing scheme for the arcjet thrusters 26 that maintains the momentum state of the body 14 of the spacecraft 10 within the capacity of the reaction wheels 62 (e.g., below the saturation point of the reaction wheels 62) to avoid unnecessary firing of the RCS thrusters 24 (e.g., for a momentum unloading operation) and maximize the efficiency of the use of propellant 40.

Figure 4:
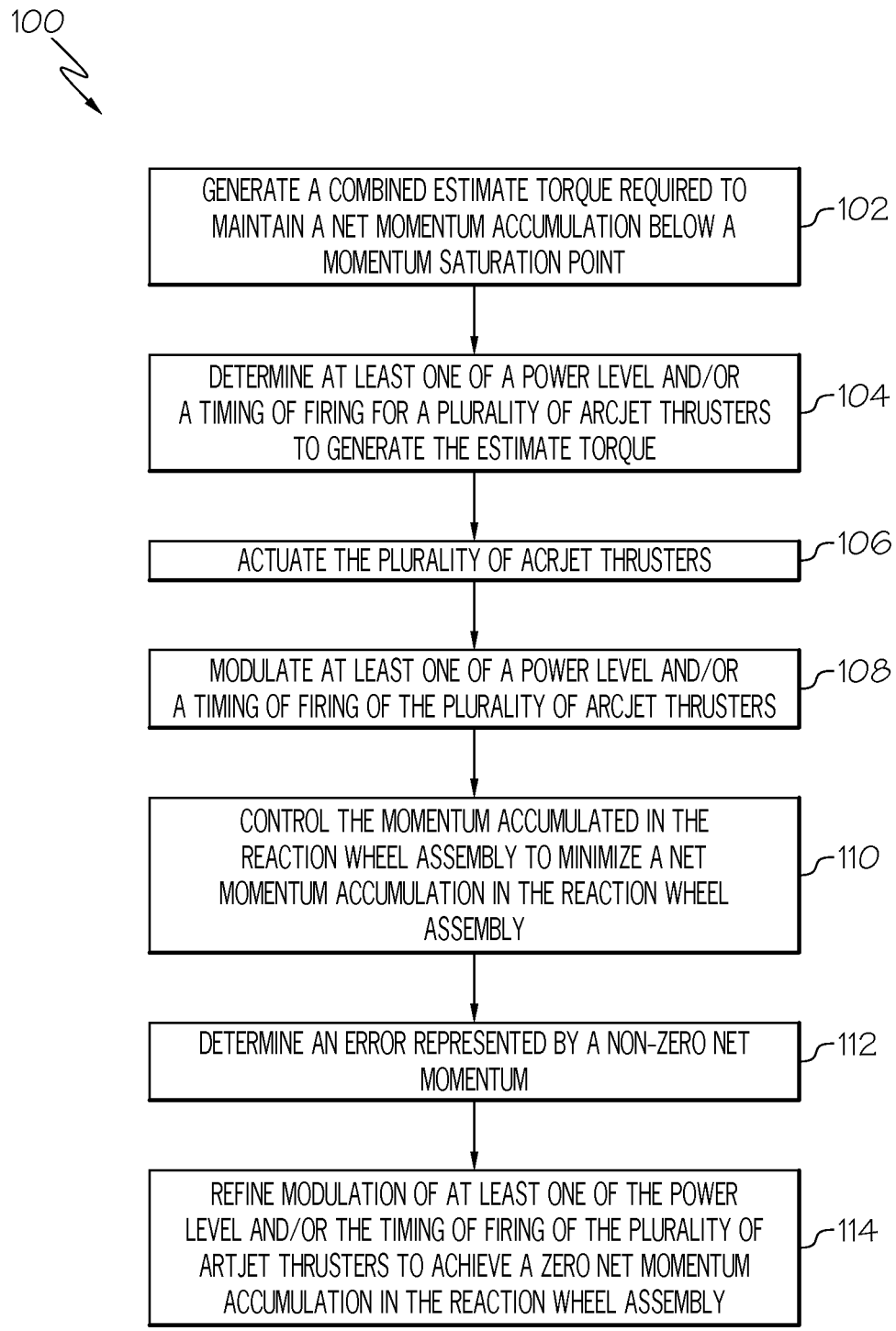
FIG. 4 is a flow diagram of one embodiment of the disclosed method for managing momentum accumulation of a spacecraft in orbit.

Referring to FIG. 4, one embodiment of the disclosed method, generally designated 100, for managing momentum (e.g., angular momentum) accumulation of the spacecraft 10 in orbit. The method 100 may begin by generating (e.g., determining and/or calculating) a combined estimate torque required to maintain a net momentum accumulation in the reaction wheel assembly 60 below the momentum saturation point of the reaction wheel assembly 60 (e.g., of the reaction wheel 62 or reaction wheels 62 corresponding to an axis of momentum), as shown at block 102.

The combined estimate torque may include a torque component in opposing directions about one or more axes of momentum of the spacecraft 10 (e.g., the body 14) generated by actuation of the opposed pair of arcjet thrusters 26. As an example, the combined estimate torque may include a first estimate torque generated by the first arcjet thruster 26a (e.g., by the thrust generated by actuation of the first arcjet thruster 26a) resulting in a first directional component of momentum about a first axis of momentum and a second estimate torque generated by the opposing second arcjet thruster 26b (e.g., by the thrust generated by actuation of the second arcjet thruster 26b) resulting in a second directional component of momentum about the first axis of momentum. The second directional component of momentum may be opposite the first directional component of momentum about the axis of momentum.

Those skilled in the art will recognize that the combined estimate torque may be generated for each axis of momentum about which actuation of one or more arcjet thrusters 26 results in a directional component of momentum. For example, a third estimate torque may be generated by the third arcjet thruster 26c and a fourth estimate torque may be generated by the fourth arcjet thruster 26d.

Referring to FIG. 5, in an example implementation of the disclosed system 68, the spacecraft 10 may include the opposed pair of arcjet thrusters 26 (e.g., the first arcjet thruster 26a and the second arcjet thruster 26b) to balance a net momentum accumulation about one axis of momentum. The first arcjet thruster 26a and the second arcjet thruster 26b may bracket the center of gravity 66. The first arcjet thruster 26a and the second arcjet thruster 26b may be opposite one another and equidistant from an axis of momentum. As one example, and as illustrated in FIG. 5, the first arcjet thruster 26a and the second arcjet thruster 26b may oppose one another and may be equidistant from a first axis of momentum 70 (e.g., the yaw axis Z) and aligned along a second axis of momentum 72 (e.g., the roll axis X).

Referring to FIG. 6, in another example implementation of the disclosed system 68, the spacecraft 10 may include the two opposed pairs of arcjet thrusters 26 (e.g., the first arcjet thruster 26a, the second arcjet thruster 26b, the third arcjet thruster 26c and the fourth arcjet thruster 26d) to balance the net momentum accumulation about two axes of momentum. The first arcjet thruster 26a, the second arcjet thruster 26b, the third arcjet thruster 26c and the fourth arcjet thruster 26d may bracket the center of gravity 66. Each opposed pair of arcjet thrusters 26 may be opposite one another and equidistant from perpendicular axes of momentum. As one example, and as illustrated in FIG. 6, the first arcjet thruster 26a and the second arcjet thruster 26b may oppose one another and may be equidistant from the first axis of momentum 70 (e.g., the yaw axis Z). The third arcjet thruster 26c and the fourth arcjet thruster 26d may oppose one another and may be equidistant from the first axis of momentum 70. The first arcjet thruster 26a and the third arcjet thruster 26c may oppose one another and may be equidistant from the second axis of momentum 72 (e.g., the roll axis X). The second arcjet thruster 26b and the fourth arcjet thruster 26d may oppose one another and may be equidistant from the second axis of momentum 72.

Referring to FIG. 4, as shown at block 104, at least one of the power level and/or the timing of firing of at least one arcjet thruster 26 of the plurality of arcjet thrusters 26 may be determined (e.g., calculated) in order to generate the combined estimate torque, such as the combined estimate torque generated at block 102. The power level and/or the timing of firing may be defined by the generated estimate torques required to maintain the net momentum accumulation to be within (e.g., below) the momentum saturation point of the reaction wheel assembly 60.

As an example, at least one of the power level and/or the timing of firing for the first arcjet thruster 26a and the second arcjet thruster 26b may be determined in order to generate the first estimate torque and the second estimate torque resulting in the net momentum accumulation about the first axis of momentum 70. As another example, at least one of the power level and/or the timing of firing for the first arcjet thruster 26a, the second arcjet thruster 26b, the third arcjet thruster 26c and the fourth arcjet thruster 26d may be determined in order to generate the first estimate torque, the second estimate torque, the third estimate torque and the fourth estimate torque resulting in the net momentum accumulation about the first axis of momentum 70 and/or the second axis of momentum 72.

Referring to FIG. 5, in an example construction of the spacecraft 10 having one pair of opposed arcjet thrusters 26, the discrete power level of the first arcjet thruster 26 and the second arcjet thruster 26b may be defined by at least one of a maximum momentum threshold and a minimum momentum threshold about the first axis of momentum 70 to balance the net momentum accumulation about the first axis of momentum 70.

The maximum momentum threshold (e.g., the maximum allowed momentum) may be determined based on the inertia of the reaction wheels 62 of the reaction wheel assembly 60 and their geometry (e.g., wheel to body transformation). For example, the maximum allowed momentum that can be absorbed by the reaction wheel assembly 60 having 100 N·m·s and 45-degree pitch pyramid angle is 140 N·m·s along an X-Z plane and 280 N·m·s along the pitch direction (e.g., along the Y-axis). Therefore, as a specific, non-limiting example, the maximum/minimum thresholds used in the disclosed method 100 may be set at 50 N·m·s and 20 N·m·s, respectably, based on the expected yaw momentum accumulation for a typical north-south maneuver.

As an example, the second discrete power level of the second arcjet thruster 26b may be greater than the first discrete power level of the first arcjet thruster 26a when the first directional component of momentum about the first axis of momentum 70 generated by the first arcjet thruster 26a is greater than the maximum momentum threshold. As another example, the first discrete power level of the first arcjet thruster 26a may be greater than the second discrete power level of the second arcjet thruster 26b when the second directional component of momentum about the first axis of momentum 70 generated by the second arcjet thruster 26b is greater than the maximum momentum threshold. As yet another example, the first discrete power level of the first arcjet thruster 26a may be equal to the second discrete power level of the second arcjet thruster 26b when the directional component of momentum about the first axis of momentum 70 generated by the first arcjet thruster 26a and the second arcjet thruster 26b is less than the minimum momentum threshold.

Determining the power level of each arcjet thruster 26 may be implemented by a power level algorithm. The power level algorithm may be:

If $h_{am} > h_{max}$, then $AJ_1 = 1500$ W or 1617 W or 1830 W and $AJ_2 = 2000$ W; else if $h_{am} < -h_{max}$, then $AJ_2 = 1500$ W or 1617 W or 1830 W and $AJ_1 = 2000$ W; else if $h_{am} < h_{min}$ or $-h_{min}$, then $AJ_1 = 2000$ W and $AJ_2 = 2000$ W.

Wherein $h_{am}$ is the component of momentum generated by the arcjet thrusters 26 about the axis of momentum, $h_{max}$ is the maximum momentum threshold in a first direction about the axis of momentum, $-h_{max}$ is the maximum momentum threshold in a second direction (e.g., opposite the first direction) about the axis of momentum, $h_{min}$ is the minimum momentum threshold in the first direction about the axis of momentum, $-h_{min}$ is the minimum momentum threshold in the second direction (e.g., opposite the first direction) about the axis of momentum, $AJ_1$ is the first arcjet thruster 26a, and $AJ_2$ is the second arcjet thruster 26b.

Referring to FIG. 6, in an example construction of the spacecraft 10 having two pairs of opposed arcjet thrusters 26, the timing of firing of each arcjet thruster 26 may be defined to balance (e.g., cancel out) the net momentum accumulation about the first axis of momentum 70 and/or the second axis of momentum 72.

The first arcjet thruster 26a, the third arcjet thruster 26c, and/or a combination of the first arcjet thruster 26a and the third arcjet thruster 26c may generate the first directional component of momentum about the first axis of momentum 70 (e.g., a negative yaw torque). The second arcjet thruster 26b, the fourth arcjet thruster 26d, and/or a combination of the second arcjet thruster 26b and the fourth arcjet thruster 26d may generate the second directional component of momentum about the first axis of momentum 70 (e.g., a positive yaw torque). The timing of firing of the first arcjet thruster 26a and/or the third arcjet thruster 26c relative to the timing of firing of the second arcjet thruster 26b and/or the fourth arcjet thruster 26d may be controlled to minimize (e.g., balance) the net momentum accumulation about the first axis of momentum 70.

Similarly, the first arcjet thruster 26a, the second arcjet thruster 26b, and/or a combination of the first arcjet thruster 26a and the second arcjet thruster 26b may generate the first directional component of momentum about the second axis of momentum 72 (e.g., a negative roll torque) and the third arcjet thruster 26c, the fourth arcjet thruster 26d, and/or a combination of the third arcjet thruster 26c and the fourth arcjet thruster 26d may generate the second directional component of momentum about the second axis of momentum 72 (e.g., a positive roll torque). The timing of firing of the first arcjet thruster 26a and/or the second arcjet thruster 26b relative to the timing of firing of the third arcjet thruster 26c and/or the fourth arcjet thruster 26d may be controlled to minimize (e.g., balance) the net momentum accumulation about the second axis of momentum 72.

The timing of firing of the arcjet thruster 26 may include a firing start time, a firing stop time, and a firing duration between the firing start time and the firing stop time. For example, modulating the timing of firing of each arcjet 26 may include operating each arcjet thruster for a predefined firing duration having a predefined firing start time and a predefined firing stop time.

The start time and/or the stop time of each arcjet thruster 26 of the opposed pair of arcjet thrusters 26 may be determined based on the measured torque (e.g., the estimate torque) of each arcjet thruster pair (e.g., first arcjet thruster 26a and second arcjet thruster 26b or third arcjet thruster 26c and fourth arcjet thruster 26d) and the direction (e.g., polarity) of the directional component (e.g., yaw component) of the total torque. For example, one arcjet thruster 26 of the pair of arcjet thrusters 26 may start a little later and/or stop it a little sooner than the opposing arcjet thruster 26 of the pair of arcjet thrusters 26 to compensate for the net momentum accumulation about the axis of momentum, such as the first axis of momentum 70 (e.g., roll momentum accumulation) or the second axis of momentum 72 (e.g., a yaw momentum accumulation). The timing of firing for each pair of arcjet thrusters 26 (e.g., first arcjet thruster 26a and second arcjet thruster 26b or third arcjet thruster 26c and fourth arcjet thruster 26d) may be determined by the ratio of the total axis of momentum disturbance of each pair of arcjet thrusters 26.

Determining the firing start time and firing stop time and, thus, the firing duration, for each arcjet thruster 26 may be implemented by timing of firing equations.

When $((\tau_1(3) + \tau_1(3)))$ is greater than zero (0), the timing of firing equation for the first arcjet thruster 26a and the second arcjet thruster 26b may be:

$$t_1^{start} = (((\tau_1(3) + \tau_2(3))/2\tau_1(3))\Delta T_{roll}$$

$$t_1^{stop} = \Delta T_{roll} - ((\tau_1(3) + \tau_2(3))/2\tau_1(3))\Delta T_{roll}$$

$$t_2^{start} = 0$$

$$t_2^{stop} = \Delta T_{roll}$$

When $((\tau_1(3) + \tau_1(3)))$ is not greater than zero (0), the timing of firing equation for the first arcjet thruster 26a and the second arcjet thruster 26b may be:

$$t_2^{start} = (((\tau_1(3) + \tau_2(3))/2\tau_2(3))\Delta T_{roll}$$

$$t_2^{stop} = \Delta T_{roll} - ((\tau_1(3) + \tau_2(3))/2\tau_2(3))\Delta T_{roll}$$

$$t_1^{start} = 0$$

$$t_1^{stop} = \Delta T_{roll}$$

When $((\tau_3(3)+\tau_4(3))$ is greater than zero (0), the timing of firing equation for the third arcjet thruster 26c and the fourth arcjet thruster 26d may be:

$$t_3^{start}=\Delta T_{roll}+(((\tau_3(3)+\tau_4(3))/2\tau_3(3))(t_{tot}-\Delta T_{roll})$$

$$t_3^{stop}=t_{tot}-((\tau_3(3)+\tau_4(3))/2\tau_3(3))(t_{tot}-\Delta T_{roll})$$

$$t_4^{start}=\Delta T_{roll}$$

$$t_4^{stop}=t_{tot}$$

When $((\tau_3(3)+\tau_4(3))$ is not greater than zero (0), the timing of firing equation for the third arcjet thruster 26c and the fourth arcjet thruster 26d may be:

$$t_4^{start}=\Delta T_{roll}+(((\tau_3(3)+\tau_4(3))/2\tau_4(3))(t_{tot}-\Delta T_{roll})$$

$$t_4^{stop}=t_{tot}-((\tau_3(3)+\tau_4(3))/2\tau_4(3))(t_{tot}-\Delta T_{roll})$$

$$t_3^{start}=\Delta T_{roll}$$

$$t_3^{stop}=t_{tot}$$

Wherein $t_1^{start}$ is the start time for the first arcjet thruster 26a, $t_1^{stop}$ is the stop time for the first arcjet thruster 26a, $t_2^{start}$ is the start time for the second arcjet thruster 26b, $t_2^{stop}$ is the stop time for the second arcjet thruster 26b, $t_3^{start}$ is the start time for the third arcjet thruster 26c, $t_3^{stop}$ is the stop time for the third arcjet thruster 26c, $t_4^{start}$ is the start time for the fourth arcjet thruster 26d, $t_4^{stop}$ is the stop time for the fourth arcjet thruster 26d, $\tau_1$ is the first torque (e.g., torque component) generated by the first arcjet thruster 26a, $\tau_2$ is the second torque (e.g., torque component) generated by the second arcjet thruster 26b, $\tau_3$ is the third torque (e.g., torque component) generated by the third arcjet thruster 26c, $\tau_4$ is the fourth torque (e.g., torque component) generated by the fourth arcjet thruster 26d, $\Delta T_{roll}$ is the time to switch to the opposed pair of arcjet thrusters 26 (e.g., time to switch from the first arcjet thruster 26a and the second arcjet thruster 26b to the third arcjet thruster 26c and the fourth arcjet thruster 26d), and $t_{tot}$ is the total firing time of all of the arcjet thrusters 26 (e.g., the first arcjet thruster 26a, the second arcjet thruster 26b, the third arcjet thruster 26c and the fourth arcjet thruster 26d).

As used herein, $\tau_{i(j)}$ may be the torque vector to the $j^{th}$ component (e.g., j=1:3) of the torque vector $\tau$ of arcjet thruster i.

$\Delta T_{roll}$ may initially be derived from the ratio of the total torque about the second axis of momentum 72 (e.g., roll torque) of the third arcjet thruster 26c and the fourth arcjet thruster 26d to the total sum of the torque about the second axis of momentum 72 (e.g., roll torque) of the first arcjet thruster 26a, the second arcjet thruster 26b, the third arcjet thruster 26c and the fourth arcjet thruster 26d. $\Delta T_{roll}$ may be determined by the following time to switch equation:

$$\Delta T_{roll}=t_{tot}((\tau_3(1)+\tau_4(1))/(\tau_1(1)+\tau_2(1)+\tau_3(1)+\tau_4(1))$$

However, the preceding time to switch equation may not yield a suitable cancellation of torque about the second axis of momentum 72 (e.g., roll toque) due to the different firing of each arcjet thruster 26 of the pair of arcjet thrusters 26 resulting in cancellation of torque about the first axis of momentum 70 (e.g., yaw torque). Thus, $\Delta T_{roll}$ may be determined by the following equations to take into account the differential firing resulting in cancellation of torque about the first axis of momentum 70.

When $((\tau_1(3)+\tau_2(3)>0$ and $\tau_3(3)+\tau_4(3)>0)$, the time to switch equation is:

$$\Delta T_{roll}=t_{tot}(((\tau_3(1)(1-(\tau_3(3)+\tau_4(3))+\tau_4(1))/(\tau_1(1)(1-((\tau_1(3)+\tau_2(3))/\tau_1(3))+\tau_2(1)+\tau_3(1)(1-((\tau_3(3)+\tau_4(3))/\tau_3(3))+\tau_4(1)))$$

When $((\tau_1(3)+\tau_2(3)<0$ and $\tau_3(3)+\tau_4(3)>0)$, the time to switch equation is:

$$\Delta T_{roll}=t_{tot}(((\tau_3(1)(1-(\tau_3(3)+\tau_4(3))/\tau_3(1))+\tau_4(1))/(\tau_1(1)-\tau_2(1)(1-((\tau_1(3)+\tau_2(3))/\tau_2(1))+\tau_3(1)(1-((\tau_3(3)+\tau_4(3))/\tau_3(3))+\tau_4(1)))$$

When $((\tau_1(3)+\tau_2(3)>0$ and $\tau_3(3)+\tau_4(3)<0)$, the time to switch equation is:

$$\Delta T_{roll}=t_{tot}(((\tau_3(1)+\tau_4(1)(1-(\tau_3(3)+\tau_4(3))/\tau_4(3))/(\tau_1(1)(1-((\tau_1(3)+\tau_2(3))/\tau_1(3))+\tau_2(1)+\tau_3(1)+\tau_4(1)(1-((\tau_3(3)+\tau_4(3))/\tau_4(3))))$$

When $((\tau_1(3)+\tau_2(3)<0$ and $\tau_3(3)+\tau_4(3)<0)$, the time to switch equation is:

$$\Delta T_{roll}=t_{tot}(((\tau_3(1)+\tau_4(1)(1-(\tau_3(3)+\tau_4(3))/\tau_4(3))/(\tau_1(1)+\tau_2(1)(1-((\tau_1(3)+\tau_2(3))/\tau_2(3))+\tau_3(1)+\tau_4(1)(1-((\tau_3(3)+\tau_4(3))/\tau_4(3))))$$

Referring to FIG. 4, the plurality of arcjet thrusters 26 may be actuated to generate a thrust, as shown at block 106. As an example, and with reference to FIGS. 5 and 6, the first arcjet thruster 26a may be actuated to generate a first thrust (e.g., a first actual thrust) at the discrete power level and/or the timing of firing, as described herein above. The second arcjet thruster 26b may be actuated to generate a second thrust (e.g., a second actual thrust) at the discrete power level and/or the timing of firing, as described herein above. Similarly, the third arcjet thruster 26c may be actuated to generate a third thrust (e.g., a third actual thrust) and the fourth arcjet thruster 26d may be actuated to generate a fourth thrust (e.g., a fourth actual thrust) at the discrete power level and/or the timing of firing, as described herein above.

As shown at block 108, the reaction wheel assembly 60 may absorb momentum in response to the thrust. As an example, and as illustrated in FIG. 5, the momentum accumulated in the reaction wheel assembly 60 (FIG. 3) may increase in response to the first toque resulting in the first directional component of momentum about the first axis of momentum generated by the first thrust. The momentum accumulated in the reaction wheel assembly 60 may decrease in response to the second torque resulting in the second directional component of momentum about the first axis of momentum generated by the second thrust.

As another example, and as illustrated in FIG. 6, the momentum accumulated in the reaction wheel assembly 60 (FIG. 3) may increase in response to the first torque and the third torque resulting the first directional component of momentum about the first axis of momentum 70 generated by the first and third thrust. The momentum accumulated in the reaction wheel assembly 60 may decrease in response to the second torque and fourth torque resulting in the second directional component of momentum about the first axis of momentum 70 generated by the second and fourth thrust.

Similarly, the momentum accumulated in the reaction wheel assembly 60 (FIG. 3) may increase in response to the first torque and the second torque resulting the first directional component of momentum about the second axis of momentum 72 generated by the first and second thrust. The momentum accumulated in the reaction wheel assembly 60 may decrease in response to the third torque and fourth torque resulting in the second directional component of momentum about the second axis of momentum 72 generated by the third and fourth thrust.

Figure 7:
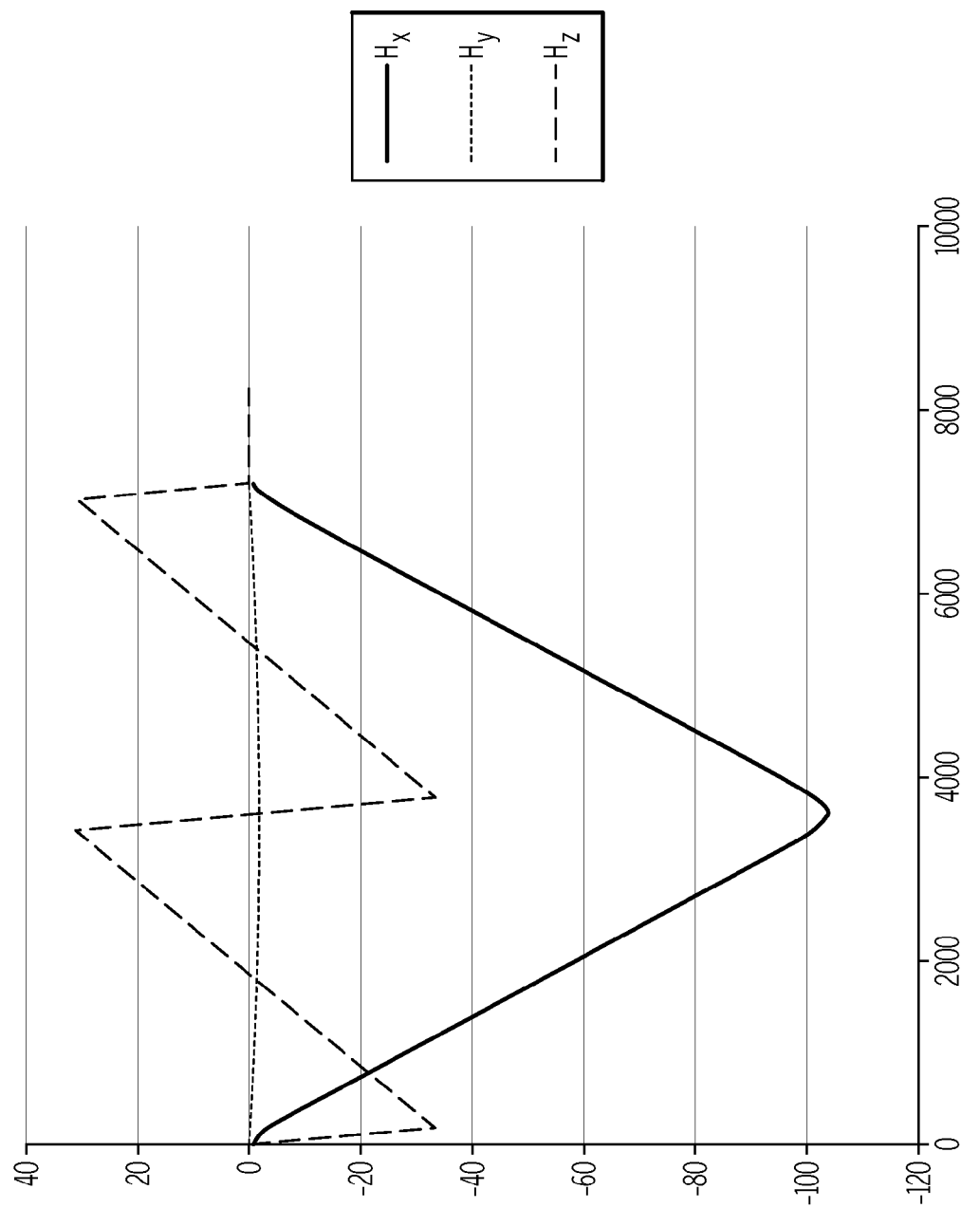
FIG. 7 is a graphical illustration of angular momentum accumulation along roll, pitch, and yaw axes during a north-south arcjet maneuver.

FIG. 7 illustrates a plot showing angular momentum accumulation along roll, pitch, and yaw axes (e.g., X, Y, and Z-axis) during a north-south arcjet maneuver. Plot line $H_x$ represents the roll momentum accumulation absorbed by the reaction wheel assembly 60. The roll momentum may increase in the negative direction (e.g., along −X) while opposed pair of arcjet thrusters 26a and 26b (FIG. 6) is firing until ground switches to opposed pair of arcjet thrusters 26c and 26d (FIG. 6). The momentum starts accumulating in the positive direction (e.g., along +X) and reaches zero momentum by the end of the maneuver.

Plot line $H_y$ represents the pitch momentum accumulation absorbed by the reaction wheel assembly 60. The pitch momentum accumulation may be significantly smaller than the two other axes (e.g., X-axis and Z-axis).

Plot line $H_z$ represents the yaw momentum accumulation absorbed by the reaction wheel assembly 60 during the maneuver. At the very beginning of the maneuver, the yaw momentum has a sharp increase in the negative direction (e.g., along −Z) as the first arcjet thruster 26a (FIG. 6) starts firing for a short duration before turning on the second arcjet thruster 26b (FIG. 6). Then the second arcjet thruster 26b is turned on and the yaw momentum starts to accumulate along the positive direction (e.g., along +Z) due to combined firing of the first arcjet thruster 26a and the second arcjet thruster 26b with a slower rate than a single arcjet. Toward the middle of the maneuver, the second arcjet thruster 26b is turned off. The yaw momentum starts to accumulate along the negative direction again until it reaches zero at the middle of the maneuver. The same trend repeats itself for the firing of the opposed pair of arcjet thrusters (e.g., the third arcjet thruster 26c and the fourth arcjet thruster 26d) for the 2nd half of the maneuver.

Referring to FIG. 4, at least one of the power level and/or the timing of firing of at least one arcjet thruster 26 of the plurality of arcjet thrusters 26 may be modulated, as shown at block 108. As shown at block 110, the momentum accumulated in the reaction wheel assembly 60 may be controlled to minimize the net momentum accumulation in the reaction wheel assembly 60.

As an example, modulating the power level of the plurality of arcjet thrusters 26 may include setting and/or changing the power level of at least one arcjet thruster 26 of the plurality of arcjet thrusters 26 to balance the momentum accumulated in the reaction wheel assembly about at least one axis of momentum. For example, modulating the power level of the plurality of arcjet thrusters 26 may include controlling the discrete power level of each arcjet thruster 26 of the plurality of arcjet thrusters 26. The discrete power level of each arcjet thruster 26 may be defined to balance the momentum accumulated in the reaction wheel assembly about an axis of momentum.

In an example implementation, and with reference to FIG. 5, modulating the power level of the plurality of arcjet thrusters 26 may include operating the first arcjet thruster 26a at a first discrete power level (e.g., controlling the first discrete power level of the first arcjet thruster 26a) and operating the second arcjet thruster 26b at a second discrete power level (e.g., controlling the second discrete power level of the second arcjet thruster 26b) to minimize and/or balance the momentum accumulated in the reaction wheel assembly about an axis of momentum.

As an example, modulating the timing of firing of the plurality of arcjet thrusters 26 may include changing the timing of firing of at least one arcjet thruster 26 of the plurality of arcjet thrusters 26 to balance the momentum accumulated in the reaction wheel assembly about at least one axis of momentum.

As an example, the firing start time of at least one arcjet thruster 26 of the plurality of arcjet thrusters 26 may be set and/or changed to balance the momentum accumulated in the reaction wheel assembly about at least one axis of momentum. As another example, the firing stop time of at least one arcjet thruster 26 of the plurality of arcjet thrusters 26 may be set and/or changed to balance said momentum accumulated in said reaction wheel assembly about at least one axis of momentum. As yet another example, the firing duration of at least one arcjet thruster 26 of the plurality of arcjet thrusters 26 may be set and/or changed to balance the momentum accumulated in the reaction wheel assembly about at least one axis of momentum.

In an example implementation, the timing of firing for at least one and/or each arcjet thruster 26 may be different. As an example, the start time for at least one arcjet thruster 26 may be different. As another example, the stop time for at least one arcjet thruster 26 may be different. As yet another example, the firing duration of at least one arcjet thruster 26 may be different.

Thus, varying the power level (e.g., the input power) and/or the timing of firing of at least one arcjet thruster 26 of the plurality of arcjet thrusters 26 may balance the net momentum accumulation about the associated axis of momentum and maintain the net momentum accumulation to be within the momentum saturation point of the reaction wheel assembly 60.

The net momentum accumulation in the reaction wheel assembly 60 resulting from momentum accumulated about the first axis of momentum 70 and/or the second axis of momentum 72 may be maintained below the momentum saturation point of the reaction wheel assembly 60. Actuation of the first arcjet thruster 26a and the opposing second arcjet thruster 26b may balance net momentum accumulation about the first axis of momentum 70, as illustrated in FIG. 5. Actuation of the first arcjet thruster 26a and the third arcjet thruster 26c and the opposing second arcjet thruster 26b and the fourth arcjet thruster 26d may balance net momentum accumulation about the first axis of momentum 70, as illustrated in FIG. 6. Actuation of the first arcjet thruster 26a and the second arcjet thruster 26b and the opposing third arcjet thruster 26c and the fourth arcjet thruster 26d may balance net momentum accumulation about the second axis of momentum 72, as illustrated in FIG. 6.

Those skilled in the art will recognize that the initial estimate torques determined for each arcjet thruster 26 may be inaccurate, for example, due to misalignments, impingement effects, arcjet thruster locations, and/or center of gravity uncertainties. Thus, following a first maneuver operation the net momentum accumulation in the reaction wheel assembly may be a non-zero net momentum accumulation. If the net momentum accumulation is above the momentum saturation point of the reaction wheel assembly 60, the RCS thrusters 24 may perform a momentum unloading operation as described herein above. Based on the net momentum accumulation profile, the power level and/or the timing of firing of at least one arcjet thruster 26 of the plurality of arcjet thrusters 26 may be refined for a subsequent maneuver.

As shown at block 112, an error represented by a non-zero net momentum accumulation in the reaction wheel assembly 60 may be determined. As shown at block 114 modulation of at least one of the power level and/or the timing of firing of the plurality of arcjet thrusters 26 may be refined to achieve a balanced (e.g., zero) net momentum accumulation in the reaction wheel assembly 60. The operations shown at blocks 112 and 114 may be performed iteratively to constantly update the power level and/or the timing of firing of the plurality of arcjet thrusters 26 in order to maintain the balanced net momentum accumulation in the reaction wheel assembly 60 to be within the momentum saturation point of the reaction wheel assembly 60.

As an example, a first actual torque resulting from actuation of the first arcjet thruster 26a may be determined. A second actual torque resulting from actuation of the second arcjet thruster 26b may be determined. The power level of at least one of the first arcjet thruster 26a and/or the second arcjet thruster 26b may be refined to maintain the net momentum accumulation in the reaction wheel assembly 60 below the momentum saturation point of the reaction wheel assembly 60.

As another example, the first actual torque resulting from actuation of the first arcjet thruster 26a, second actual torque resulting from actuation of the second arcjet thruster 26b, a third actual torque resulting from actuation of the third arcjet thruster 26c and a fourth actual torque resulting from actuation of the fourth arcjet thruster 26d may be determined. At least one of the power level and/or the timing of firing of at least one of the first arcjet thruster 26a, the second arcjet thruster 26b, the third arcjet thruster 26c and/or the fourth arcjet thruster 26d may be refined to maintain the net momentum accumulation in the reaction wheel assembly 60 below the momentum saturation point of the reaction wheel assembly 60.

Although various embodiments of the disclosed system and method have been shown and described, modifications may occur to those skilled in the art upon reading the specification. The present application includes such modifications and is limited only by the scope of the claims.

What is claimed is:

1. A system for managing momentum accumulation of a spacecraft in orbit, said spacecraft comprising a body defining at least one face, said system comprising:
    a reaction wheel assembly for controlling an attitude of said body and absorbing momentum;
    a plurality of arcjet thrusters coupled to said face to generate thrust; and
    a control processor coupled to said plurality of arcjet thrusters for controlling said thrust, wherein said control processor is configured to:
        actuate at least one of said plurality of arcjet thrusters to generate a first thrust, said first thrust generating a first directional component of momentum about an axis of momentum; and
        actuate at least two of said plurality of arcjet thrusters to generate a second thrust, said second thrust generating a second directional component of momentum about said axis of momentum opposite to said first directional component of momentum,
    wherein a net momentum accumulated in said reaction wheel in response to said first thrust and said second thrust is maintained below a momentum saturation point of said reaction wheel assembly.

2. The system of claim 1 wherein said net momentum is zero.

3. The system of claim 1 further comprising a power conditioning unit coupled to said plurality of arcjets,
    wherein said power conditioning unit is configured to control a discrete power level of said each arcjet thruster.

4. The system of claim 3 wherein said plurality of arcjet thrusters comprises:
    a first arcjet thruster comprising a first discrete power level controllable by said power conditioning unit; and
    a second arcjet thruster comprising a second discrete power level controllable by said power conditioning unit;
    wherein said first arcjet thruster and said second arcjet are opposite one another and equidistant from an axis of momentum, and
    wherein said first discrete power level and said second discrete power level are defined to balance said net momentum about said axis of momentum.

5. The system of claim 1 wherein said plurality of arcjet thrusters comprises:
    a first arcjet thruster comprising a first timing of firing controllable by said control processor; and
    a second arcjet thruster comprising a second timing of firing controllable by said control processor,
    wherein said first arcjet thruster and said second arcjet are opposite one another and equidistant from an axis of momentum, and
    wherein said first timing of firing and said second timing of firing are defined to balance said net momentum about said axis of momentum.

6. The system of claim 5 wherein said plurality of arcjet thrusters further comprises:
    a third arcjet thruster comprising a third timing of firing controllable by said control processor; and
    a fourth arcjet thruster comprising a fourth timing of firing controllable by said control processor,
    wherein said axis of momentum is a first axis of momentum,
    wherein said third arcjet thruster and said fourth arcjet thruster are opposite one another and equidistant from a second axis of momentum, and
    wherein said third timing of firing and said fourth timing of firing are defined to balance said net momentum about said second axis of momentum.

7. The system of claim 6 wherein said first timing of firing, said second timing of firing, said third timing of firing, and said fourth timing of firing are defined to balance said net momentum about both said first axis of momentum and said second axis of momentum.

8. A method for managing momentum accumulation of a spacecraft in orbit, said method comprising:
    actuating, by way of a control processor, at least one of a plurality of arcjet thrusters to generate a first thrust, said first thrust generating a first directional component of momentum about an axis of momentum;
    actuating, by way of said control processor, at least two of said plurality of arcjet thrusters to generate a second thrust, said second thrust generating a second directional component of momentum about said axis of momentum opposite to said first directional component of momentum;
    accumulating momentum in a reaction wheel assembly in response to said first thrust and said second thrust; and
    maintaining a net momentum accumulation in said reaction wheel assembly below a momentum saturation point of said reaction wheel assembly.

9. The method of claim 8 further comprising modulating a power level of said plurality of arcjet thrusters by changing said power level of at least one arcjet thruster of said at least two of said plurality of arcjet thrusters to balance said momentum accumulated in said reaction wheel assembly about at least one axis of momentum.

10. The method of claim 8 further comprising modulating a timing of firing of said plurality of arcjet thrusters by at least one of:
- changing a firing start time of at least one arcjet thruster of said at least two of said plurality of arcjet thrusters to balance said momentum accumulated in said reaction wheel assembly about at least one axis of momentum;
- changing a firing stop time of said at least one arcjet thruster of said at least two of said plurality of arcjet thrusters to balance said momentum accumulated in said reaction wheel assembly about at least one axis of momentum; and
- changing a firing duration of said at least one arcjet thruster of said at least two of said plurality of arcjet thrusters to balance said momentum accumulated in said reaction wheel assembly about at least one axis of momentum.

11. The method of claim 8 further comprising:
- generating a combined estimate torque resulting from actuation of said plurality of arcjet thrusters required to balance said net momentum accumulation in said reaction wheel assembly; and
- determining at least one of a power level and a timing of firing of said plurality of arcjet thrusters to generate said combined torque estimate.

12. The method of claim 11 further comprising:
- determining an error represented by a non-zero net momentum accumulation in said reaction wheel assembly; and
- refining modulation of at least one of said power level and said timing of firing of said plurality of arcjet thrusters to balance said net momentum accumulation in said reaction wheel assembly.

13. A method for managing momentum accumulation of a spacecraft in orbit, said method comprising:
- actuating, by way of a control processor, a first arcjet thruster to generate a first thrust;
- increasing momentum accumulated in a reaction wheel assembly in response to a first directional component of momentum about an axis of momentum generated by said first thrust;
- actuating, by way of said control processor, a second arcjet thruster to generate a second thrust; and
- decreasing said momentum accumulated in said reaction wheel assembly in response to a second directional component of momentum about said axis of momentum generated by said second thrust,
- wherein a net momentum accumulation in said reaction wheel assembly is below a momentum saturation point of said reaction wheel assembly.

14. The method of claim 13 further comprising:
- operating said first arcjet thruster at a first discrete power level; and
- operating said second arcjet thruster at a second discrete power level,
- wherein said first discrete power level and said second discrete power level are defined by at least one of a maximum momentum threshold and a minimum momentum threshold about said axis of momentum to balance said net momentum accumulation about said axis of momentum.

15. The method of claim 14 further comprising setting said second discrete power level to be higher than said first discrete power level when a first directional component of momentum about said axis of momentum generated by said first arcjet thruster is greater than said maximum momentum threshold.

16. The method of claim 14 further comprising setting said first discrete power level to be higher than said second discrete power level when a second directional component of momentum about said axis of momentum generated by said second arcjet thruster is greater than said maximum momentum threshold.

17. The method of claim 14 further comprising setting said first discrete power level to be equal to said second discrete power level when said a directional component of momentum about said axis of momentum generated by first arcjet and said second arcjet thruster is less than said minimum momentum threshold.

18. The method of claim 13 further comprising:
- operating said first arcjet thruster at a first firing timing; and
- operating said second arcjet thruster at a second firing timing,
- wherein said first firing timing and said second firing timing are defined to balance said net momentum accumulation about said axis of momentum.

19. The method of claim 13 wherein said axis of momentum is a first axis of momentum, and wherein said method further comprises:
- actuating a third arcjet thruster to generate a third thrust;
- increasing said momentum accumulation in said reaction wheel assembly in response to a first directional component of momentum about a second axis of momentum;
- actuating a fourth arcjet thruster to generate a fourth thrust; and
- decreasing said momentum accumulation in said reaction wheel assembly in response to a second directional component of momentum about said second axis of momentum,
- wherein said net momentum accumulation in said reaction wheel assembly is below said momentum saturation point of said reaction wheel assembly.

20. The method of claim 19 further comprising:
- operating said first arcjet thruster at a first firing timing;
- operating said second arcjet thruster at a second firing timing;
- operating said third arcjet thruster for a third firing duration; and
- operating said fourth arcjet thruster for a fourth firing duration,
- wherein said first firing timing, said second firing timing, said third firing duration and said fourth firing duration are defined to balance said net momentum accumulation about said first axis of momentum and said second axis of momentum.

21. The method of claim 19 further comprising:
- generating a first estimate torque resulting from actuation of said first arcjet thruster, a second estimate torque resulting from actuation of said second arcjet thruster, a third estimate torque resulting from actuation of said third arcjet thruster and a fourth estimate torque resulting from actuation of said fourth arcjet thruster required to maintain said net momentum accumulation in said reaction wheel assembly below said momentum saturation point of said reaction wheel assembly; and
- determining at least one of a power level and a timing of firing for said first arcjet thruster, said second arcjet thruster, said third arcjet thruster and said fourth arcjet thruster to generate said first estimate torque, said second estimate torque, said third estimate torque and said fourth estimate torque.

22. The method of claim 19 further comprising:

determining a first actual torque resulting from actuation of said first arcjet thruster;

determining a second actual torque resulting from actuation of said second arcjet thruster;

determining a third actual torque resulting from actuation of said third arcjet thruster;

determining a fourth actual torque resulting from actuation of said fourth arcjet thruster; and refining at least one of a power level and a timing of firing for at least one of said first arcjet thruster, said second arcjet thruster, said third arcjet thruster and said fourth arcjet thruster to maintain said net momentum accumulation in said reaction wheel assembly below said momentum saturation point of said reaction wheel assembly.

\* \* \* \* \*